United States Patent [19]

Kern et al.

[11] Patent Number: 4,947,700

[45] Date of Patent: Aug. 14, 1990

[54] CONTINUOUSLY VARIABLE TRANSMISSION SYSTEM AND LONG TRAVEL TORSION DAMPER THEREFOR

[75] Inventors: John M. Kern, Ithaca; Donald E. Freyburger, Freeville; Karl F. Schneider; Romas B. Spokas, both of Ithaca, all of N.Y.

[73] Assignee: Borg-Warner Automotive, Inc., Troy, Mich.

[21] Appl. No.: 189,766

[22] Filed: May 3, 1988

[51] Int. Cl.$^5$ .............................. F16D 3/66; F16D 3/80
[52] U.S. Cl. ................................... 74/445; 192/106.2; 464/7; 464/24; 464/68; 474/72
[58] Field of Search .......................... 192/70.17, 106.2; 464/7, 24, 68; 74/445; 474/72

[56] References Cited

U.S. PATENT DOCUMENTS

| | | | |
|---|---|---|---|
| 2,337,134 | 12/1943 | Thelander | 192/106.2 |
| 2,513,379 | 7/1950 | Thelander | 192/106.2 |
| 2,574,573 | 11/1951 | Libby | 192/106.2 |
| 2,674,863 | 4/1954 | Thelander | 464/7 |
| 4,139,995 | 2/1979 | Lamarche | 192/106.2 |
| 4,304,107 | 12/1981 | Fall et al. | 192/106.2 X |
| 4,433,594 | 2/1984 | Smirl | 475/206 |
| 4,478,322 | 10/1984 | Carlson et al. | 192/0.055 |
| 4,484,898 | 11/1984 | Kohno | 464/64 |
| 4,585,427 | 4/1986 | Lamarche | 464/67 |
| 4,790,792 | 12/1988 | Bopp | 192/106.2 X |

FOREIGN PATENT DOCUMENTS 61-290235 12/1986 Japan ................................ 192/106.2

OTHER PUBLICATIONS

SAE Technical Paper Series No. 870393, Entitled: "Torsional Dampers and Alternative Systems to Reduce Driveline Vibrations", by Hans Jurgen Drexl.
SAE Technical Paper Series No. 870394, Entitled: "The Two-Mass Flywheel-A Torsional Vibration Damper for the Power Train of Passenger Cars State of the Art and Further Technical Development", by Arno Sebulke.

Primary Examiner—Rodney H. Bonck
Attorney, Agent, or Firm—Neuman, Williams et al.

[57] ABSTRACT

This invention relates to a unique transmission system for applying torque from an engine flywheel to the drive train of an automotive vehicle including a long travel viscous damped torsional damper driven by the flywheel and coupled to a continuously variable transmission which in turn is coupled to a wet drive clutch, the output of which is connected to an output counter shaft for the automotive drive train. An important part of the unique combination is the long travel viscous damped torsional damper of the invention which includes an enclosed, effectively sealed housing contains input and output members coupled through a plurality of series parallel spring sets and immersed in a viscous medium to provide effective viscous damping matched to the effective spring rate of the mechanical damping system to accommodate both transient and steady-state vibrational torques. The damper is especially useful with the continuously variable transmission but is useful in other applications as well.

24 Claims, 7 Drawing Sheets

CONTINUOUSLY VARIABLE TRANSMISSION SYSTEM AND LONG TRAVEL TORSION DAMPER THEREFOR

This invention relates to a long travel viscous torsion damper and a continuously variable transmission system employing such a damper.

BACKGROUND OF THE INVENTION

Continuously variable transmissions differ from the conventional automatic and manual transmissions in that continuously variable transmissions do not employ fixed gear ratios. Instead, they employ variably spaced sheave plates and hydraulic systems for the control thereof whereby the two sheaves are independently pressurized to clamp a belt at any desired effective sheave ratio. The effective gear ratio is adjusted by opening and closing the sheaves and forcing the belt radially inward or outward. Because of this mode of varying the effective gear ratio, prior art arrangements of the engine, damper, and starting clutch followed by the transmission have been found undesirable. In such systems gear ratio changes are attempted while the clutch is disengaged and the transmission sheaves not in motion, resulting in problems of wear and noise. One proposed solution to this problem is disclosed in U.S. Pat. No. 4,433,594, issued Feb. 28, 1984 and entitled Variable Pulley Transmissions, where the clutch is moved downstream of the transmission and the sheaves are continuously moving.

In manual transmissions, it has been found desirable to couple the output of the torsion damper to a clutch assembly which is in turn connected to the manual transmission whose output is applied to the drive train of an automotive vehicle. Such a system is well known in the art. The torsion damper in such a manual transmission usually has relatively short travel with a high spring rate provided for the take-up of engine vibrations and also high starting and shut-down torques. While the clutch is disengaged, the manual transmission can be shifted to any desired forward or reverse gear to apply the appropriate gear ratio and direction of travel to the subsequent drive train without risk of damage or excessive wear. Excessive torques are avoided by clutch slippage and a multiple rate damper spring system.

With the development of automatic transmissions, early transmissions used a hydraulically actuated torque converter which reduced the need for a vibration damper as engine vibrations and impulses as well as start-up and shut-down transients could be damped hydraulically in the torque converter.

In later developments, a positive drive clutch was interposed in the torque converter to bypass the torque converter at higher speeds and provide a direct drive between the engine and transmission. With that new development in automatic transmission systems, the need for a vibration damper again arose although start-up and shut-down problems were less severe. Such a system could use a conventional short travel vibration damper. This history of transmission system development as it relates to torsional dampers is explained in U.S. Pat. Nos. 4,585,427 and 4,139,995 which are incorporated herein by reference.

Where a torque converter is not utilized or is by-passed in an automatic transmission system by a direct drive clutch the need arose for a damper which would accommodate both engine vibration and the high torque of start-up and shut-down. Such dampers, known as long travel dampers, are also described in U.S. Pat. Nos. 4,139,995 and 4,585,427. Dampers in such systems are required to take up not only engine vibrations but start-up and shut-down torques as well.

With the advent of the continuously variable transmission system of U.S. Pat. No. 4,433,594 and the repositioning of the clutch, the damper was outside of the transmission enclosure and was designed to run dry. However, experience has shown that a dry torsion damper such as disclosed in that patent has several drawbacks when applied to a continuously variable transmission of the general type disclosed in U.S. Pat. No. 4,433,594. Furthermore, as taught in the U.S. Pat. No. 4,433,594, it was found highly desirable in continuously variable transmission systems to place the starting clutch at the output of the transmission rather than at the input. Among the reasons the configuration of this patent was found desirable was the requirement for shifting the effective gear ratio in the continuously variable transmission while the transmission was in motion. Attempts to change the effective gear ratio while the transmission was static resulted in excessive wear, excessive shifting forces and possible damage to the transmission parts during the efforts to change gear ratio under static conditions.

In working with transmission systems of the type provided in U.S. Pat. No. 4,433,594, however, it was found that the use of a torsion damper of conventional design produced unsatisfactory results, excessive wear in such dry dampers and insufficient damping for engine start-up and shut down torques. When the system was designed to have a damper rate appropriate for accommodating the inertia and physical forces experienced in start-up and shut down, the damper was ineffective with respect to vibration from the engine operation or the design parameters were exceeded.

SUMMARY OF THE INVENTION

To alleviate some of the foregoing difficulties experienced in the prior art, this invention provides a system including a long travel torsional vibration damper which operates in an environment of a lubricating viscose medium within an effectively sealed housing. The damper is connected to a continuously variable transmission, reversing gear system and drive clutch to provide a torque output to the automotive system. Short travel dampers operating in a dry environment are well known in the art, especially as applied to manual clutch and transmission systems. Long travel dampers are normally applied to systems employing automatic transmissions with torque converters and direct drive clutches. As such the long travel damper is mounted inside the torque convertor in a fully enclosed environment lubricated with transmission oil.

However, with the advent of a continuously variable transmission with a wet starting clutch at the downstream location described above, it was found necessary to provide a long travel damper at the transmission input for the reasons already explained. As the system used no torque convertor, dry torsional dampers were first used. However, such systems resulted in a high level of noise and very high wear rates as a result of an un-lubricated environment. As a result of these experiences the instant system and the long travel torsional damper described and claimed herein were developed.

The purpose of the damper is to transmit the mean engine torque to the continuously variable (CV) transmission and ultimately through the drive clutch to the wheels and also to reduce engine-induced torsional vibrations before they enter the CV transmission drive line.

It was found that the transmission system and the long travel transient and vibration damper of this invention resulted not only in a lubricated environment reducing wear and noise in the system, but also very desirable viscose damping characteristics. These benefits were also obtained by substantially filling the long travel damper environment with a viscose grease or appropriate transmission oil.

When moving the respective movable parts in this viscose medium, hydraulic damping of the system was obtained through the shear forces on the viscous medium itself. Such a system is simpler, less expensive and more reliable than any system which employs fluid displacement to some remote chamber for damping purposes.

With this invention, torsional windup measurements during transient conditions of engines start-up and shutdown showed very desirable relationships between windup and engine torque, moreover, under conditions of continuous operation and engine vibration damping was also optimized.

THE DRAWINGS

For a better understanding of the invention reference will now be made to the accompanying drawings wherein.

DETAILED DESCRIPTION OF THE DRAWINGS

Figure 1:
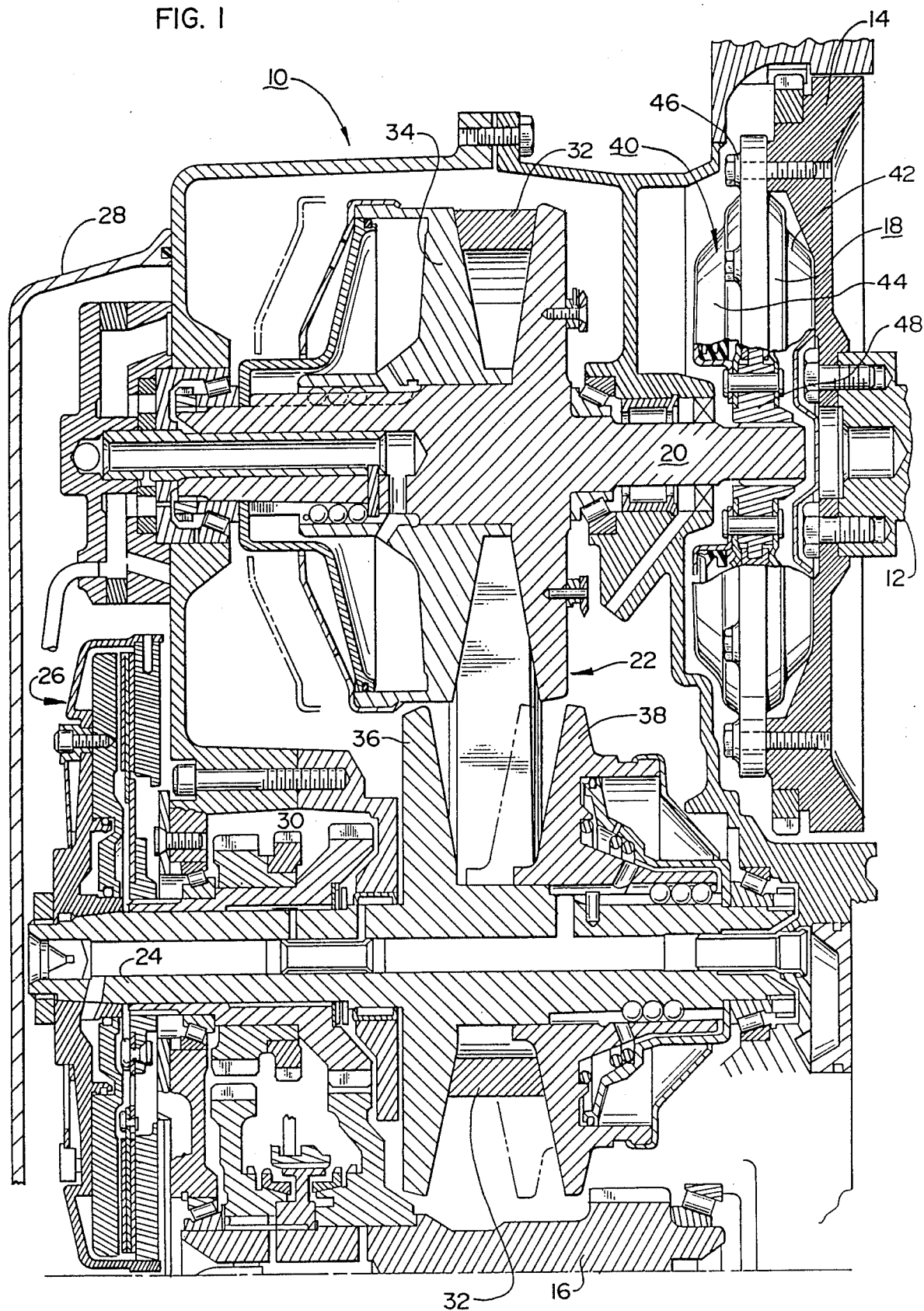
FIG. 1 is a diagrammatic cross sectional view of the entire transmission system of this invention.

Referring now to the drawings, and more particularly to FIG. 1, a transmission system in accordance with this invention is disclosed which is generally similar to the transmission system of U.S. Pat. No. 4,433,594. For a greater understanding of the overall transmission system, reference can be made to the description and drawings of that patent, which generally correspond to the layout and to some of the details of FIG. 1.

In FIG. 1, the transmission system 10 is shown connected between the engine flywheel 14 and the transmission output counter shaft 16 which is connected directly to a differential or similar output system. The lower half of the shaft 16 and the differential which were shown and described in U.S. Pat. No. 4,433,594 are omitted from these drawings for simplicity and easier overall understanding.

The engine flywheel 14 has secured to it the long travel vibration damper 18 of this invention. The damper 18 is shown in FIG. 1 partially in elevation and partially in cross section for clarity. The output of vibration damper 18 is applied to input shaft 20 of the continuously variable transmission 22. The output shaft 24 of the continuously variable transmission 22 is coupled to the drive clutch 26 which operates in the oil wet environment within the transmission housing 28. The clutch 26 is thus lubricated and provides the positive drive connection as is known in the art. The output of drive clutch 26 is coupled through the cluster driver gears 30 and the counter shaft 16 which is in turn connected to the differential (not shown). For a greater understanding of the overall transmission system reference is again made to the drawings and description of U.S. Pat. No. 4433594.

As shown in FIG. 1, the positions of the belt and sheaves of the continuously variable transmission would provide an effective high gear ratio. As shown therein the driving belt 32 is forced by the adjustable sheave plate 34 to the outer position shown at the top of the sheave, providing an effective large diameter first pulley. Under these conditions the belt 32 as shown in the bottom portion of FIG. 1 rests near the shaft of the output or secondary sheave having a fixed face 36 and associated hydraulicly driven adjustable face 38. Thus, the belt 32, as shown in FIG. 1 rests near the center of rotation effectively providing a small diameter output sheave. In combination with the first sheave this provides an effective high transmission ratio.

It has been found extremely difficult and harmful to the system to attempt to move the sheave faces 34 and 38 when the transmission is static. Thus, in CV transmissions it was found desirable to move the drive clutch 26 from its conventional position in earlier transmissions adjacent to the vibration damper 18 to a position downstream from the transmission and associated with the output of the transmission, as shown in FIG. 1. With this configuration, the continuously variable transmission 22 was directly connected to the engine flywheel 14 isolated only by the vibration damper 18. Also the vibration damper 18 was now free to operate in a dry environment as shown in FIG. 1.

As shown and explained in U.S. Pat. No. 4,433,594 with such an organization of the transmission components the vibration damper could be operated as a dry device with the component parts exposed to atmospheric conditions and relying solely on the temporary storage of energy in the compressed springs of the vibration damper for smoothing vibration phenomena.

The advantages of this transmission system design include the location of the drive clutch downstream where it can act as a fuse in case of sudden sheave depressurization in the CV transmission. Furthermore, as already explained, the sheaves and belt can continue to rotate even under idle conditions when the drive clutch is disengaged. This allows the belt/sheave ratio to be changed under dynamic conditions, reducing belt slip and improving belt durability, both during shut-down and subsequent clutch re-engagement and vehicle acceleration. However, it has been found that the system as described in U.S. Pat. No. 4433594 has several disadvantages which have been overcome by this invention.

As the engine is started from rest the entire CV transmission drive line inertia must be accelerated to engine idle speed. Upon engine shut-down the drive line inertia must likewise be absorbed during deceleration. The transient torsion transmitted through the damper and through the CV transmission drive line, during engine start-up and shut-down, can be extremely large, and may substantially exceed the capacity of even a conventional long travel vibration damper. This resulted, in prior designs, in excessive belt slip, reduced damper reliability and undesirable component noise attributable to the large transient torsional phenomena. Any efforts at adjustment of the spring rate, to accommodate the transient problems more effectively, resulted in deterioration of performance characteristics for engine noise and vibration resulting from idle speed, normal operation and the like. For the foregoing reasons the instant invention contemplates the use of a long travel vibration damper with viscose fluid medium damping in the system described above. One such long travel vibration damper with a viscose medium is illustrated in FIG. 1 as damper 18.

Figure 2:
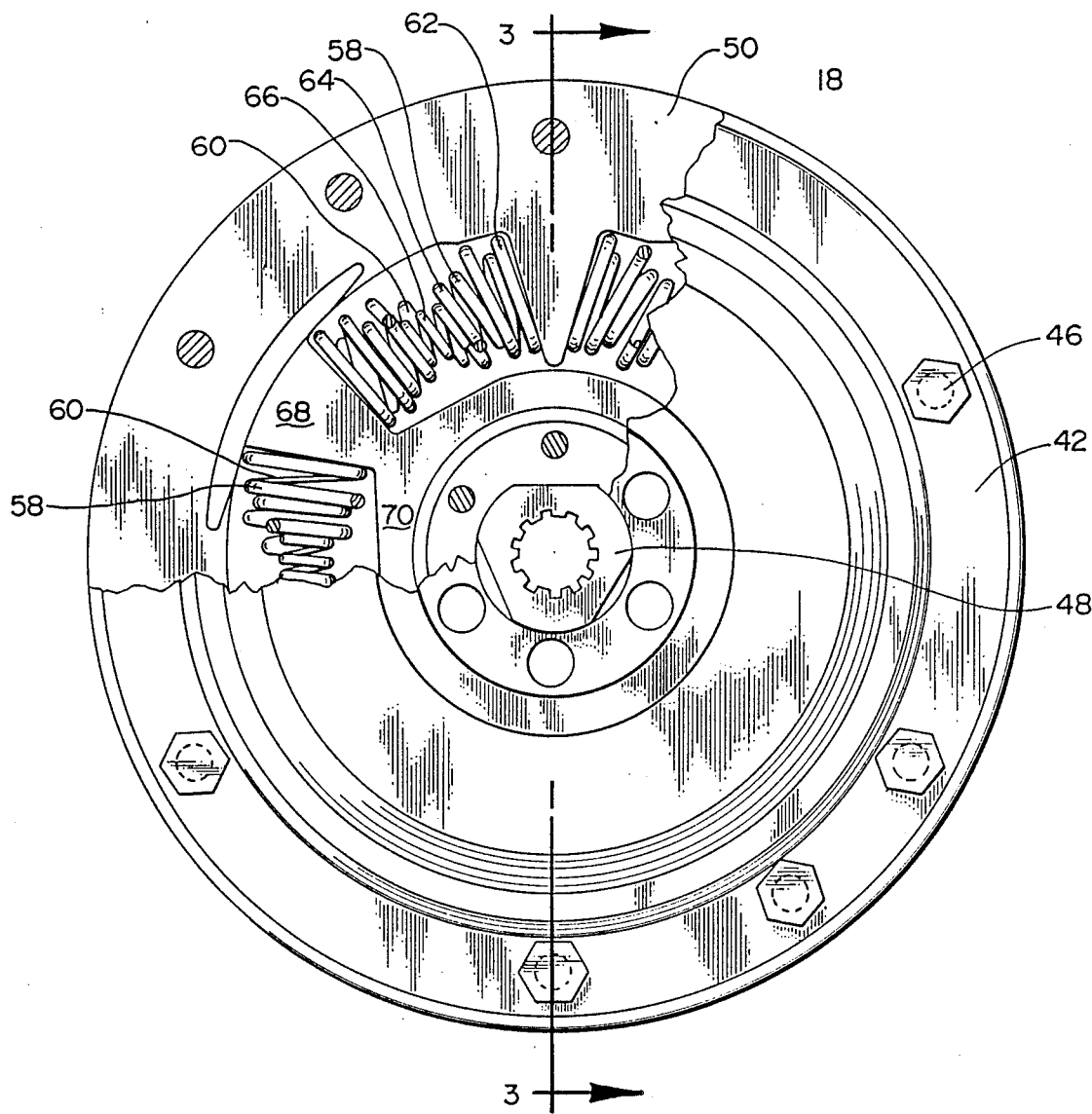
FIG. 2 is a plan view partially in section of a first embodiment of the long travel vibration damper of this invention.
Figure 3:
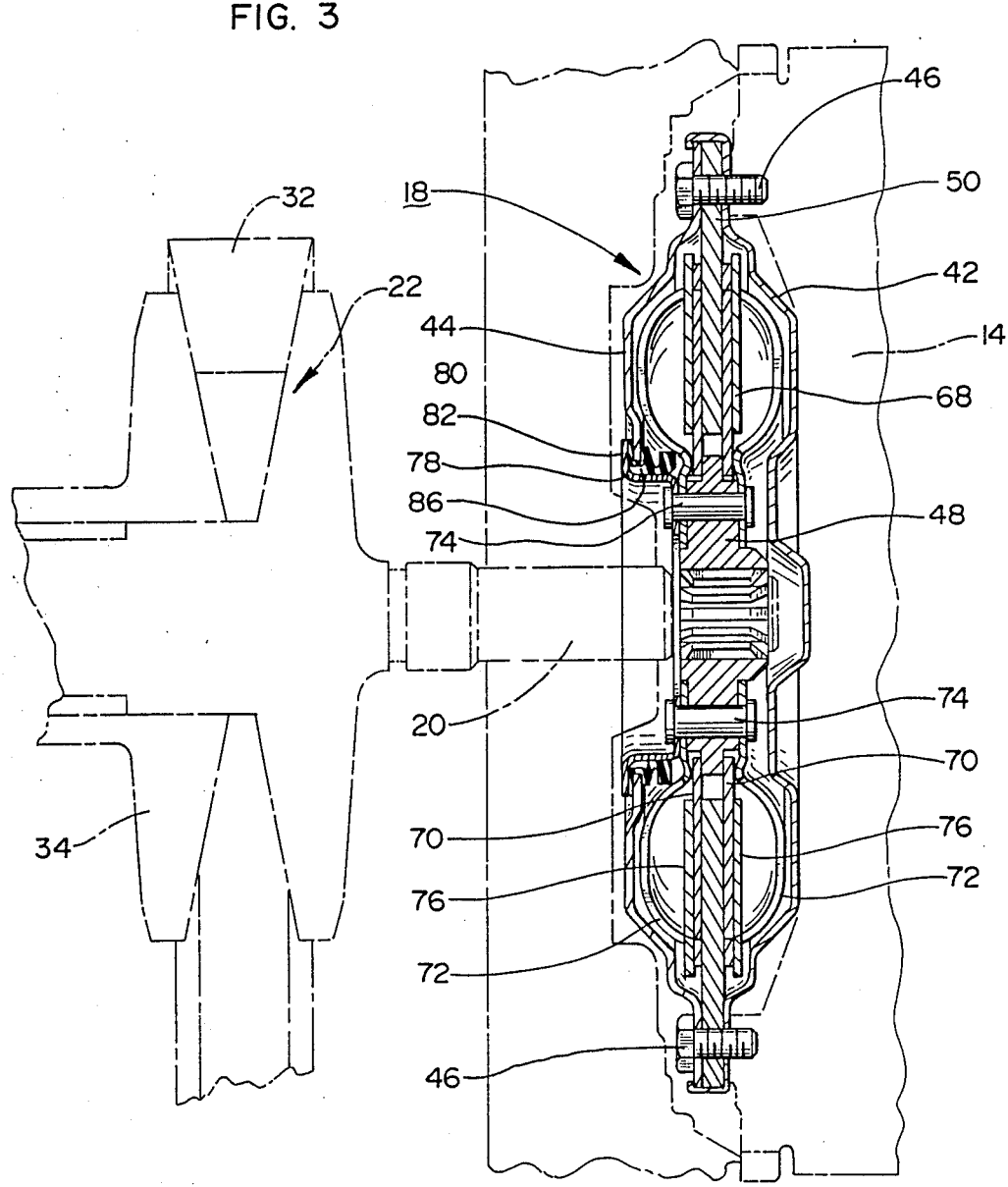
FIG. 3 is a transverse sectional view taken along the line 3—3 of FIG. 2.

Referring now to FIGS. 2 and 3, the vibration damper 18 of FIG. 1 is shown and will be described. As shown in FIG. 1 the torsion damper housing 40 is made up of two basic parts, a front cover 42 and a rear cover 44. The two covers are assembled together about their outer circumferences and held against the flywheel 14 by a plurality of bolts 46 threaded into the flywheel, in appropriate threaded apertures. The bolts 46 and the front damper cover 42 are clearly shown in FIG. 2 and in FIG. 3 and the manner in which the front cover 42 may be crimped over the rear cover 44 is also shown. The front and rear covers 42 and 44 may also be welded to provide an integral fluid-tight structure.

Figure 6:
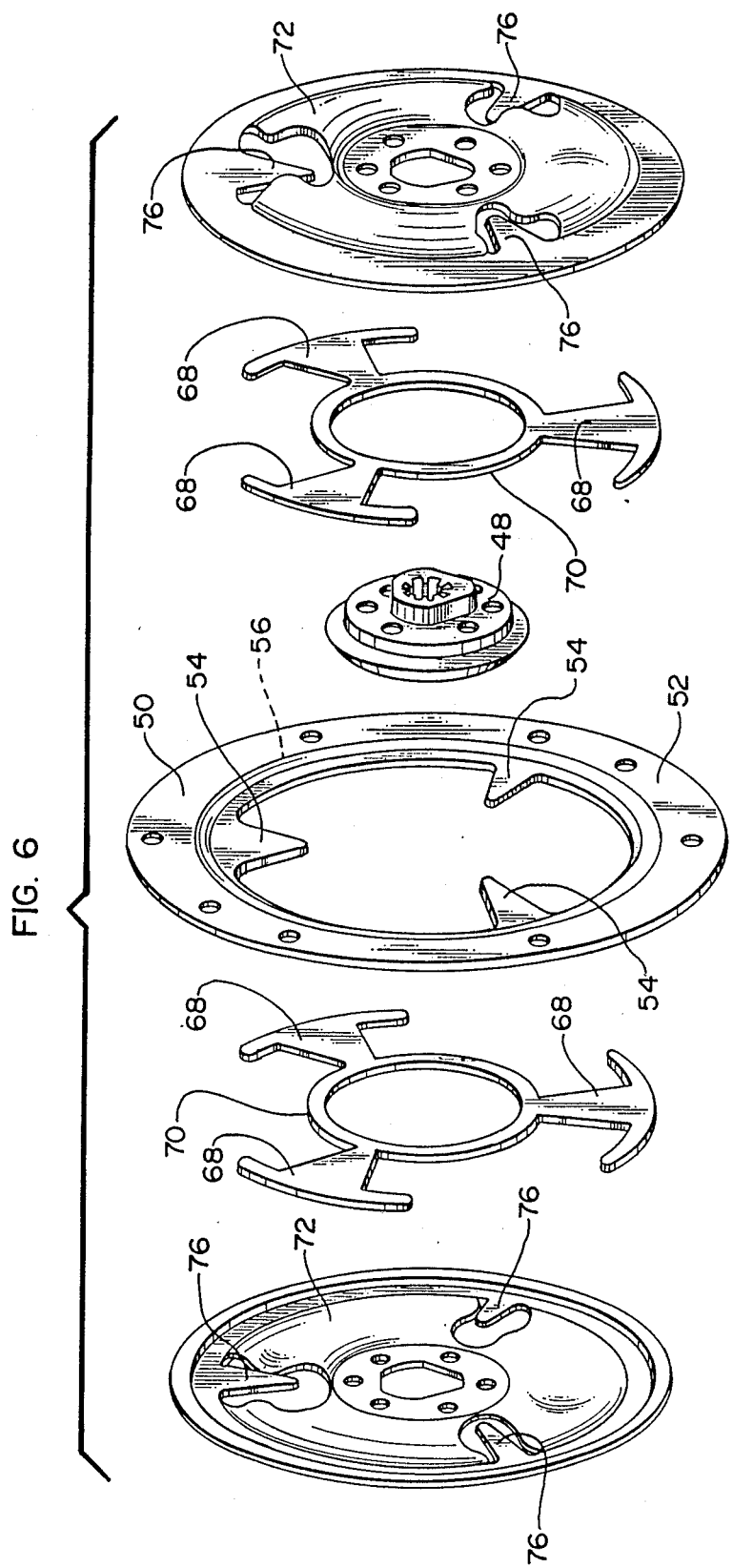
FIG. 6 is an exploded view of parts of the long travel damper of FIG. 1.

The output of the damper 18 is provided by a hub 48 which is splined to an input shaft 20 of the continuously variable transmission 22, the hub 48 is also shown in FIGS. 2 and 6 and in cross-section in FIG. 3.

The internal construction of the damper 18 will be clear from FIGS. 2, 3 and 6. As shown there, input plate 50 is secured between the front cover 42 and the rear cover 44 by a peripheral ring portion 52 which is apertured and receives the bolts 46. The front cover 42 has a flange formed outwardly over the input plate 50 and rear cover 44. The front cover 42, input plate 50, and rear cover 44 are clamped against the flywheel 14 by bolts 46 to form an integral assembly.

As shown best in FIG. 6, the input plate 50 has three equally spaced arms 54 which extend radially to define 3 arcuate chambers 56 therebetween.

Each chamber 56 is designed to receive a set of spring means 58 as shown in the broken away portions of FIG. 2. In the preferred embodiment described and shown herein, there are two spring means 58 which make up a series set 60, and there are three such sets disposed between the adjacent arms 54 of input plate 50. As is understood in this art, each spring means 58, of which there are a total of six in the preferred embodiment, is made up of three concentric helical springs 62, 64 and 66. The springs 62, 64 and 66, which make up one spring means 58, may be different lengths and different wire diameter to provide a desired multiple rate of spring means having a prescribed displacement to compression relationship.

The two spring means 58 of each set 60 are held apart by one leg 68 of a pair of equalizers 70 each having three legs. One of the equalizers 70 is shown in FIG. 2 and both are shown in their respective orientations in the exploded view of FIG. 6. The legs 68 can also be seen in the cut-away of FIG. 3, extending radially from the hub 48 on which the equalizers 70 are mounted for free relative rotation. As is understood in this art, the freely rotatable equalizers 70 effectively place the first spring means 58 of each of the three sets in a parallel force relationship and that combination of three spring means is effectively in series through the legs 68 with the second spring means 58 of each of the three sets 60.

By virtue of this configuration of six spring means having multiple spring rates with the spring means organized in the described series-parallel relationship, a long travel damper is provided where travel can be as much as 60 degrees. Other spring configurations including floating spaces to replace the equalizers are also known.

The hub 48 is splined to the input shaft 20 of the CV transmission 22 as already described. In addition to that splined connection the hub 48 has two driven plates 72 attached thereto by a series of rivets 74 as shown in FIG. 3. The driven plates have tabs 76 formed therein at 120 degree intervals to match the three arms 54 of the driving plate 50. Because the three tabs 76 align with the three arms 54, they are not immediately apparent in FIG. 2 but can be seen in cross-section in FIG. 3 and in perspective in FIG. 6.

It should be apparent that the number of tabs and arms is a matter of choice dictated by the design of the damper and the damping and spring rate characteristics desired. At least two tabs and arms diametrically opposed relative to hub 48 will always be used, but three, four or five equally spaced tabs and arms are also appropriate in a given design.

The way in which the long travel damper functions is known in the art and is specifically described, for example, in U.S. Pat. No. 4,585,427. However, in the instant invention the long travel damper is incorporated into a damper design including an effectively sealed enclosure made up of the front cover 42 and rear cover 44, plus an appropriate rear cover retainer 78. The rear cover retainer is annular and is also held against the hub 48 by the rivets 74. The rear cover retainer 78 has a flange secured by rivets 74, a rim portion extending longitudinally and a radial flange 80 which overlies the inner edge of the rear cover 44 to form a pair of parallel surfaces.

Figure 3A:
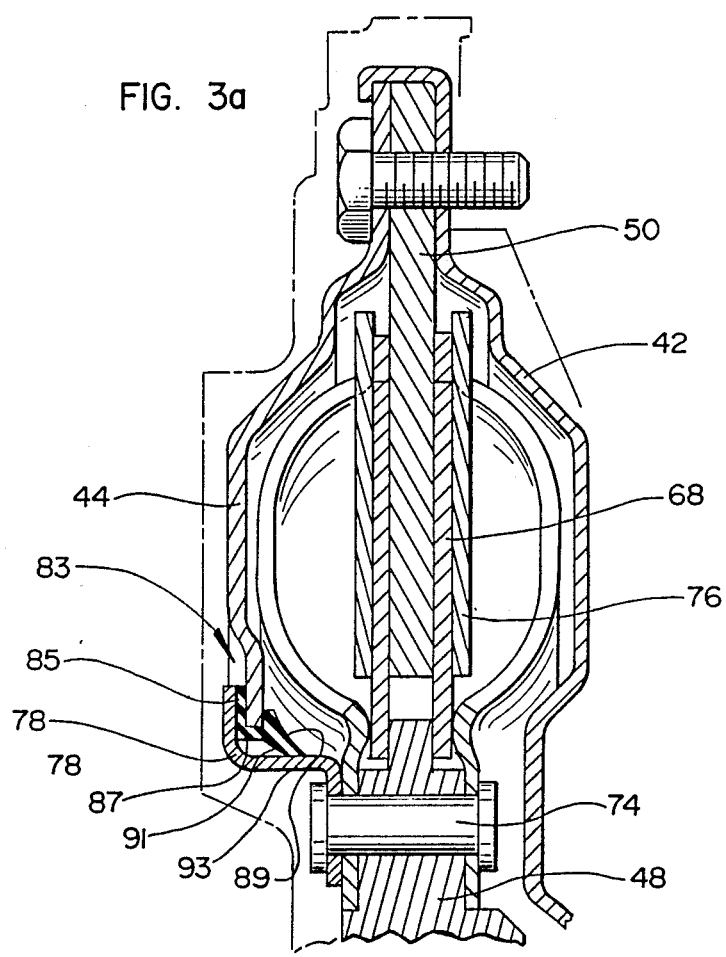
FIG. 3a illustrates an alternate one piece seal for use in the embodiment of FIG. 3.

A seal of glass-filled teflon, resilient plastic or the like 82 is disposed between the flange faces of the rear cover 44 and cover retainer 78 to form a seal there between. The seal 82 is preferably of an L cross-section lying between the two flanges and radial inwardly of the flange of the rear cover 44 as shown to form a lip seal. A second resilient seal may be formed in an annular configuration as shown in FIG. 3, where the seal is clamped by the rivets 74 against the hub 48 and has a resilient portion extending radially outwardly and longitudinally to form a flap 86 which engages the inner surface of the flange of rear cover 44 to form a face seal. Other sealing techniques may be employed in order to preserve substantial fluid integrity within the chamber defined by front cover 42, rear cover 44 and rear cover retainer 78. For example, an available seal that has been found satisfactory is a single piece annular device that combines both the lip seal and the face seal functions described above. The seal is fabricated in one piece of glass impregnated teflon as shown in FIG. 3(a). The seal 83 has an outer wall 85, a bottom 87 and an inner wall 89 which form a channel that snaps into place on the edge of rear cover 44. The outer wall 85 forms a seal between rear cover 44 and rear cover retainer 78. A face seal lip 91 extends downwardly and forms a face seal against the cylindrical wall 93 of retainer 78. Seals of this type are available from Chicago Rawhide Mfg. Co. of Elgin, Ill.

The cavity defined by the housing is substantially filled with an appropriate viscose material in accordance with the invention. In the preferred embodiment of FIGS. 1, 2 and 3 the viscose medium is a viscose grease having minimum oil separation characteristics, optimum temperature stability and mechanical stability and long lubrication life at contemplated operating temperatures up to about 120° C. The grease should be water resistant and compatible with the materials of which the damper is manufactured.

Two greases which have been found to be suited for use in the long travel damper and transmission system of this invention are manufactured by Exxon Corporation and are identified by Exxon as Unirex N2 and Unirex N3.

The Unirex N2 and Unirex N3 were tested in the transmission described above for durability. The Unirex N2 and Unirex N3 greases did not separate or soften significantly after actual road tests over substantial distances. There was no significant leakage from the housing constructed as shown and described herein. The grease contributed significant viscous damping which permitted the utilization of the full damper displacement under high torque conditions while dissipating sufficient energy under short duration vibration effects to provide smooth and stable operation. Furthermore, at engine start up, the greases provide the necessary damping and lubrication to avoid rattling and other bothersome noises from the system.

In addition to the preferred grease, Exxon Unirex N3 and the alternative, Unirex N2, a grease identified as Mobilux EP111, a product of the Mobil Corporation has also been found satisfactory. Mobilux EP111 is a black, tacky lithium filled grease with a heavy base oil. The greases useful in this invention must resist centrifugal separation even at relatively high rotating speeds and elevated ambient temperatures.

Figure 4:
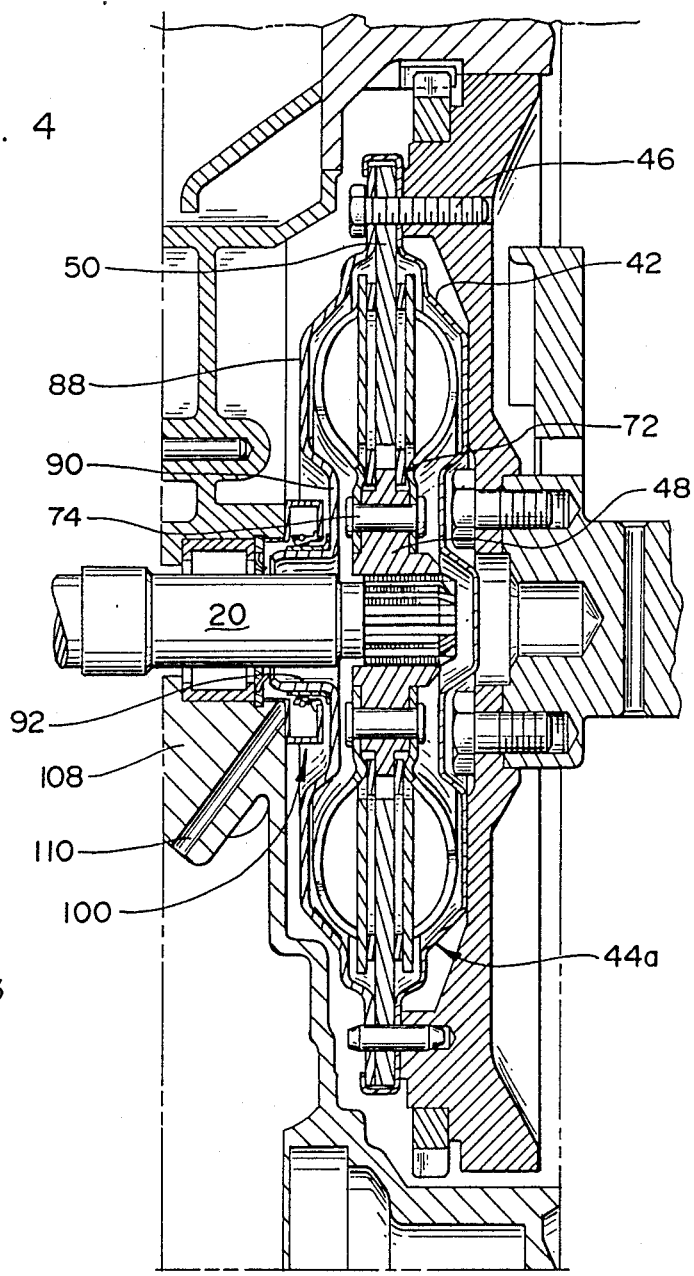
FIG. 4 is a transverse sectional view of a second embodiment of the invention utilizing transmission oil as the viscose medium.
Figure 5:
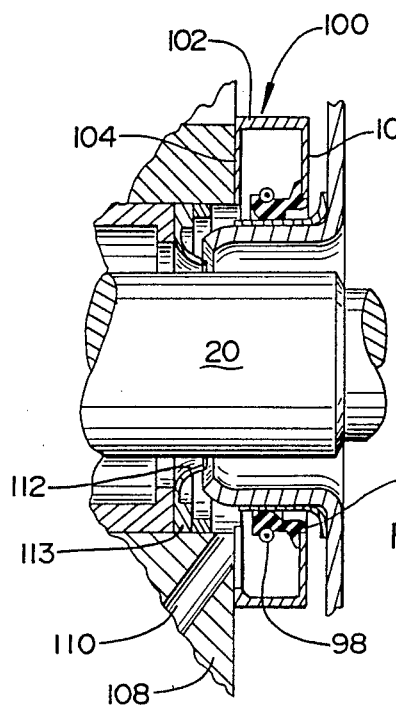
FIG. 5 is an enlarged view of the seal and charging system of the vibration damper of FIG. 4.

Referring now to FIG. 4 and 5 of the drawings, an alternate embodiment is disclosed in which the viscous medium is a transmission oil and preferably the transmission, oil which is appropriate for and used in the CV transmission drive clutch and drive gears. As shown in FIG. 4, the same front cover 42 of the housing as described with respect to FIG. 3 is associated with a modified rear cover 88 adapted for containing the transmission oil in the oil filled embodiment. The rear cover 88 is secured with the front cover 42 and the input ring 50 by bolts 46 as already described with respect to FIG. 3. Appropriate seals can be placed between the several plates. The hub 48 is secured with the output plates 72 by rivets 74 as also described above with respect to FIG. 3. However, the rear cover 88 forming the housing of the damper 18 is shaped to accommodate the spring sets in the medial annular portion and then is formed inwardly to provide a radially extending web portion 90 which terminates in an axially extending housing tube 92.

The housing tube 92 is spaced a small radial distance from the shaft 20 of the CV transmission to permit the ingress and egress of transmission oil from the transmission cavity to the chamber defined by the damper housing 40a. While Unirex N2 and Unirex N3 grease are highly viscous, and do not flow from the chamber defined by the housing, the transmission oil does flow and the resulting movement of oil is dependent upon the dynamics of the system.

The relationship between the housing tube 92 and the shaft 20 is illustrated in FIG. 5. As can be seen in FIG. 5, a metallic seal member 94 is secure on the housing tube 92 and against the radially extending housing wall 90 with a press fit. A sealing ring 96 of rubber, neoprene or the like is held against the seal 94 by a coil spring retainer 98 and the sealing ring is fused to a metal housing 105. The sealing ring 96 is enclosed in a metallic annular member 100 which has cylindrical walls 102 and 103 and a radially extending base wall 104. The radially extending base wall 104 apertured at the bottom of the shaft passageway in the transmission housing 108 to define an oil drain passageway 110 by which transmission oil can return from the damper enclosure defined by the housing 40a to the transmission sump. A deflector ring 112 is also provided within the transmission casing 108 which will positively direct transmission oil into the damper enclosure defined by the housing 40a and away from oil drain passageway 110. The deflector ring 112 is metallic and is mounted in the transmission housing 108. It does not rotate with either the damper housing or the CV input shaft 20. The deflector is held in an appropriate recess 113 formed in the transmission housing 108 and by virtue of the centrifugal action of the oil against the deflector 112, the oil is forced to the right in FIG. 5 to fill the damper housing centrifically when the engine is running.

When the engine is running, the transmission oil is centrifically forced outwardly in the damper housing and additional oil is splashed to the right in FIG. 5 to fill the remainder of the housing and provide viscous damping while in operation. When the engine is stopped, the transmission oil drains through drainage opening 110 back into the transmission sump and the level of transmission oil in the damper housing will be at about the level dictated by this drainage arrangement.

OPERATION

The operation of both the grease filled and oil filled embodiments should be clear from the foregoing description of the devices. In both devices, the engine flywheel 14 is directly connected to the housing 40 and input plate 50 of the damper 18 through the multi-rate spring means and the viscous damping of the oil or grease. Flywheel motion is applied through the yieldably coupling of damper 18 to the input shaft 20 of the CV transmission 22. With the exception of the displacement from the input of the damper resulting from the relationship of torque and damping rate of the damper, the shaft 20 will rotate in synchronism with the flywheel 14. However, the damper will isolate and moderate the excessive torques resulting from start-up to idle and shut down of the engine as well as the vibrational torques resulting from normal multi-cylinder engine operation. The transient and torsional vibrations which would otherwise be present in the entire system as a result of engine vibration and start-up and shut down persist for a shorter time and are more uniformally damped as a result of the combination of long travel springs and viscous damping characteristics associated with the damper 18. By providing the viscous damping and torsional displacement available from the dampers of this invention, the system described in FIG. 1 becomes a practical and workable system in which the CV transmission can continuously rotate with the engine, expediting effective gear ratio changes in a manner not heretofore available. Wear on the belt 32 and the associated sheaves is minimized, vibration and noise during operation are minimized and a wet drive clutch can be utilized at the output of the CV transmission without the detrimental effects heretofore experienced. It has been found that with a selection of spring means known in the art, the system described can provide a damper displacement of up to 60° and that using the equivalent of the Unirex N3 grease, the transient response to an impulse can be damped to minimal significance in approximately .25 seconds. The displacement available and the torque displacement relationship can be adjusted by selecting the length and spring rate of the springs which make up a spring means and this relationship is understood in the art. Similarly, the viscous damping, which in the instance described above was found to be approximately 0.5 newton meter seconds per radian, provides satisfactory damping characteristics for such a combination.

Figure 7:
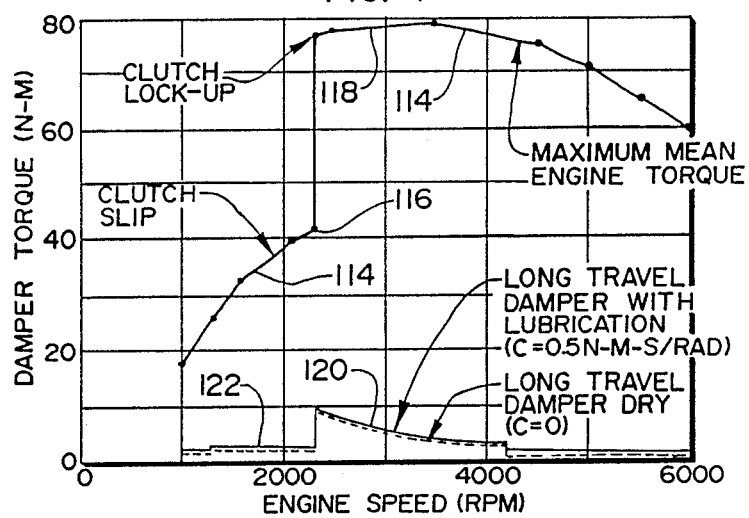
FIG. 7 is a chart illustrating the speed-torque relationship in system constructed in accordance with this invention.

A computed steady state chart of damper torque vs. engine speed is shown in FIG. 7. The curves provide a comparison of mean engine torque with the vibratory torque amplitude as transmitted through the damper to the primary shaft for a long travel spring damper system with and without viscous damping. The system is modeled on a three cylinder engine in drive mode at an underdrive belt ratio of 2.26.

The mean engine torque transmitted through the damper is shown by curve 114. As shown, mean engine torque rises as the clutch slips during engagement up to the point 116 of clutch lock-up where torque rises abruptly to the level of curve 118. Also shown in solid lines in FIG. 7 is the vibratory torque component 120 which appears at the damper output at order 1.5. As can be seen, the periodic component of torque represented by the solid line 120 rises to about 10 n.m. at clutch lock-up in the computed operation. The corresponding curve for the system run without the lubricant and viscous damping is illustrated by the broken line 122. As can be seen, the periodic component of torque is slightly less without the viscous medium, as would be expected. However the significance of the viscous damping is well illustrated in FIGS. 8 and 9.

Figure 8:
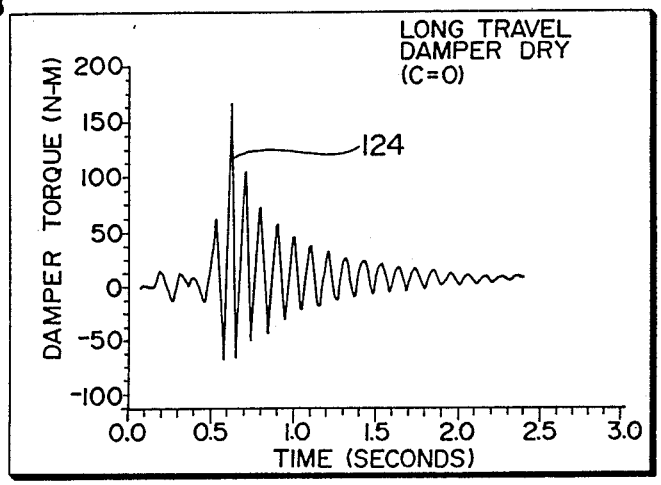
FIG. 8 shows the transient damping characteristics in one prior art system.

FIG. 8 is a chart of the actual operation of an embodiment of the invention essentially like that of FIGS. 1–3 but without the viscous damping medium in place. The chart is a plot 124 of long travel damper torque against time beginning with unique cranking from time 0.0 to about 0.5 seconds. At engine start-up there is a substantial torque impulse in the order of 170 n.m. and a transient decay which is plotted for about two seconds.

Figure 9:
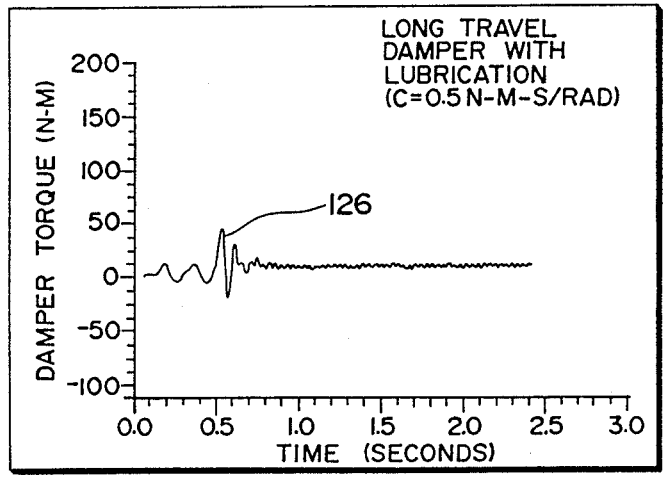
FIG. 9 shows the transient damping characteristics of a system built according to this invention.

In contrast, FIG. 9 is a plot of the transient response of the long travel torsional damper with the viscous damping medium in place as described with respect to FIGS. 1–3. In FIG. 9 it is clear from the line 126 that the initial start-up torque is substantially reduced to about 50 n.m. and the transient decay occurs in less than 0.5 seconds.

Data was computed to analyze the operation of a conventional short travel damper with and without viscous damping. It was found for such a system the periodic vibratory torque is very high at order 1.5 in the drive mode with a gear ratio of 2.26 in a CV transmission. The vibratory torque in such a system has been computed at more than one half of the maximum mean engine torque at speeds just above the clutch lock-up. Such a system even with some type of viscous damping would be subject to excessive noise and wear and would produce perceptible drive train roughness.

While it has been known in the prior art to use displacement fluid damping in combination with two mass damper systems and low travel damper systems, the construction and operation of the invention described herein provides enhanced results by virtue of the long travel damper configuration described in an appropriate combination with an adequate viscous medium to dampen transient phenomena which might otherwise exceed the available travel of the mechanical design and also dampen otherwise annoying vibration.

The invention which we claim is:

1. A long travel vibration damper assembly to transmit torque between a torque input member and a torque output member comprising a housing, generally circular input means within said housing and adapted for operative connection to the torque input member for rotation therewith, said input means having a plurality of uniformly spaced tabs extending radially therefrom, hub means adapted for operative connection to the torque output member and having a plurality of spaced arms corresponding to said tabs, said tabs and arms being generally aligned and defining a plurality of annularly disposed chambers, spacer means having portions disposed within said chambers and movable therein relative to said tabs and arms, a set of multiple rate spring means, disposed between each adjacent pair of said arms and tabs, each multiple rate spring means including a plurality of spring means disposed in parallel relation and of different rates such as to allow large angular displacements between said torque input member and said torque output member, and each multiple rate spring means of each said set of multiple rate spring means being spaced apart from an adjacent multiple rate spring means of said set by one of said spacer means portions, and a viscous medium substantially filling said housing and substantially surrounding said tabs, hub means, spacer means and spring means and operative through shear forces to provide viscous damping resistance to said large relative angular displacements between said torque input member and said torque output member, said housing being effectively sealed to define a cavity to contain said viscous medium therein while permitting rotational connections to said torque input member and to said torque output member.

2. The long travel vibration damper assembly of claim 1 wherein the housing and the input means are secured together peripherally and said tabs extend radially inwardly between adjacent spring means.

3. The long travel vibration damper of claim 1 wherein said multiple rate spring means comprises a plurality of concentric helical springs of different overall lengths, the spring rate and lengths of the springs being selected to provide the desired total spring rate for each relative displacement between said arms and said tabs.

4. The long travel vibration damper of claim 1 wherein the housing is sealed against significant escape of the viscous medium and the viscous medium is a grease.

5. The long travel vibration damper of claim 4 wherein the grease is a multipurpose lithium complex grease having a base oil viscosity index of about 95 and an oil separation of under 3%.

6. The long travel damper of claim 4 wherein the grease is water resistant, has minimum oil separation characteristics, and is mechanically stable to temperatures in the vicinity of 120° C.

7. The long travel vibration damper of claim 4 wherein the input member is and engine flywheel, the housing comprises a front cover having a peripheral flange secured to the fly wheel and having a central concave portion to accommodate the hub, the spacer means, the tabs and the spring means, a rear cover having a peripheral flange generally corresponding with the flange of said front cover and overlying said front cover to accommodate said arms, tabs, spacer means and spring means, rear cover retaining means defining in cooperation with said front and rear covers an enclosed chamber extending from said hub means and having a portion in close proximity to said rear cover, and resilient seal means extending between said rear cover and said retaining means to form a seal therebetween to retain said grease within said housing while permitting relative rotation therebetween.

8. The long travel vibration damper of claim 7 wherein the circular input means is secured in sealing relationship with said front cover and said rear cover.

9. The long travel vibration damper of claim 7 wherein said seal means comprises a lip seal secured between a radially inward portion of said rear cover and a radially outwardly extending flange forming a part of said retainer means.

10. The long travel vibration damper of claim 1 for use as an input device to a transmission and the viscous medium is transmission oil, wherein the housing is sealed against significant escape of the oil, said housing having a drain opening to said transmission and means for filling said damper with said oil from the transmission.

11. The long travel vibration damper of claim 10 wherein the input member is an engine flywheel rotatably mounted in a transmission enclosure, the housing comprises a front cover having a peripheral flange secured to the flywheel and having a central concave portion to accommodate the hub, the spacer means, the tabs and the spring means, a rear cover having a peripheral flange generally corresponding with the flange of said front cover and overlying said front cover to accommodate said arms, tabs, spacer means and spring means, and seal means secured to said enclosure and forming an oil tight seal with said rear cover, said seal means having a portion disposed between said output member and said rear cover whereby oil is forced into the chamber defined by said covers.

12. The long travel vibration damper of claim 11 wherein the circular input means is secured in sealing relationship with said front cover and said rear cover.

13. The long travel vibration damper of claim 11 wherein said rear cover is spaced from said output member to define an annular passageway between said transmission enclosure and the housing cavity, means forming a seal between said rear cover and said enclosure and means secured to said enclosure to force said oil through said annular passageway and into said cavity.

14. The long travel vibration damper of claim 1 wherein said sets of spring means will permit relative angular displacement up to about 60 degrees between said tabs and said arms.

15. The long travel vibration damper of claim 14 wherein said viscous damping resistance is at least about 0.5N.M.S/RAD.

16. The long travel vibration damper of claim 1 wherein said viscous medium also provides lubrication within said housing.

17. Transmission apparatus between a torque input member and a torque drive member comprising long travel vibration damper means coupled to said torque input member and having torque output means continuously variable transmission means having an input sheave coupled to said torque output means, an output sheave and a belt drivingly connected therebetween, and clutch means for positively coupling and decoupling an output counter shaft with respect to the torque drive member, said long travel vibration damper comprising a housing, generally circular input means within said housing and adapted for operative connection to the torque input member for rotation therewith, said input means having a plurality of uniformly spaced tabs extending radially therefrom, hub means adapted for operative connection to the torque output member and having a plurality of spaced arms corresponding to said tabs, said tabs and arms being generally aligned and defining a plurality of annularly disposed chambers, spacer means having portions disposed within said chambers and movable therein relative to said tabs and arms, a set of multiple rate spring means disposed between each adjacent pair of said arms and tabs, each multiple rate spring means including a plurality of spring means of different rates disposed in parallel relation and of different rates such as to allow large angular displacements between said torque input member and said torque output member, and each multiple rate spring means of each said set of multiple rate spring means being spaced apart from an adjacent multiple rate spring means of said set by one of said spacer means portions, and a viscous medium substantially filling said housing and substantially surrounding said tabs, hub means, spacer means and spring means and operative through shear forces to provide viscous damping resistance to said large relative angular displacements between said input member and said hub means, said housing being effectively sealed to define a cavity to contain said viscous medium therein while permitting rotational connections to said torque input member and to said torque output member.

18. The transmission apparatus of claim 17 including reversing means having an input connected to said output sheave and having an output means connected to said clutch means.

19. The transmission apparatus of claim 17 wherein the housing and the input means are secured together peripherally and said tabs extend radially inwardly between adjacent spring means.

20. The transmission apparatus of claim 17 wherein said multiple rate spring means comprises a plurality of concentric helical springs of different overall lengths, the spring rate and lengths of the springs being selected to provide the desired total spring rate for each displacement of said arms relative to said tabs.

21. The transmission apparatus of claim 17 wherein the housing is sealed against significant escape of the viscous medium and the viscous medium is a grease.

22. The transmission apparatus of claim 21 wherein the grease is a multipurpose lithium complex grease having a base oil viscosity index of about 95 and an oil separation of under 3%.

23. The transmission apparatus of claim 21 wherein the grease is water resistant, has minimum oil separation characteristics, and is mechanically stable to temperatures in the vicinity of 120° C.

24. The transmission apparatus of claim 21 wherein the input member is an engine flywheel, the housing comprises a front cover having a peripheral flange secured to the flywheel and having a central concave portion to accommodate the hub, the spacer means, the tabs and the spring means, a rear cover having a peripheral flange generally corresponding with the flange of said front cover and overlying said front cover to accommodate said arms, tabs, spacer means and spring means, rear cover retaining means extending from said hub means and having a portion in close proximity to said rear cover, and resilient seal means extending between said rear cover and said retaining means to form a seal therebetween to retain said grease within said housing while permitting relative rotation therebetween.

* * * * *